(12) United States Patent
Ma et al.

(10) Patent No.: US 11,486,815 B2
(45) Date of Patent: Nov. 1, 2022

(54) METHOD AND SYSTEM FOR PREDICTING CORROSION FATIGUE LIFE OF PRESTRESSED CONCRETE BRIDGES

(71) Applicant: CHANGSHA UNIVERSITY OF SCIENCE & TECHNOLOGY, Hunan (CN)

(72) Inventors: Yafei Ma, Hunan (CN); Xiaochao Su, Hunan (CN); Lei Wang, Hunan (CN); Jianren Zhang, Hunan (CN); Zhongzhao Guo, Hunan (CN)

(73) Assignee: CHANGSHA UNIVERSITY OF SCIENCE & TECHNOLOGY, Hunan (CN)

( * ) Notice: Subject to any disclaimer, the term of this patent is extended or adjusted under 35 U.S.C. 154(b) by 406 days.

(21) Appl. No.: 16/758,868

(22) PCT Filed: Jul. 16, 2019

(86) PCT No.: PCT/CN2019/096061
§ 371 (c)(1),
(2) Date: Apr. 24, 2020

(87) PCT Pub. No.: WO2020/042781
PCT Pub. Date: Mar. 5, 2020

(65) Prior Publication Data
US 2021/0199560 A1    Jul. 1, 2021

(30) Foreign Application Priority Data

Aug. 27, 2018 (CN) .......................... 201810977815.3

(51) Int. Cl.
*G01N 17/00* (2006.01)
*G01N 3/32* (2006.01)
(Continued)

(52) U.S. Cl.
CPC ............. *G01N 17/006* (2013.01); *E01D 1/00* (2013.01); *G01N 3/32* (2013.01); *E01D 2101/26* (2013.01);
(Continued)

(58) Field of Classification Search
CPC .......... G06F 30/20; G06F 30/23; G06F 30/13; G01N 17/00; G01N 33/383; G01N 17/006;
(Continued)

(56) References Cited

FOREIGN PATENT DOCUMENTS

CN          105825030        8/2016
CN          105825030 A   *  8/2016    ......... G06F 17/5004
(Continued)

OTHER PUBLICATIONS

"International Search Report (Form PCT/ISA/210) of PCT/CN2019/096061," dated Sep. 26, 2019, pp. 1-5.
(Continued)

*Primary Examiner* — Brandi N Hopkins
(74) *Attorney, Agent, or Firm* — JCIP Global Inc.

(57) ABSTRACT

The invention discloses a method and a system for predicting the corrosion fatigue life of prestressed concrete bridges. A corrosion level of the strand is predicted to obtain the residual tension force of a structure. A stress concentration factor is integrated to consider the stress concentration effect caused by pitting corrosion, and a growth model of the elastic stress of the strand under the coupled effect of corrosion and fatigue is proposed. A growth model of the plastic stress of the strand is established using a cross-section loss of the strand as a fatigue damage parameter based on a degenerated elastic modulus of the concrete after fatigue. Failure criteria for the concrete, the strand, and a longitudinal tension bar are defined, so that a set of methods
(Continued)

for analyzing the life of a prestressed concrete bridge subjected to corrosive environment and fatigue load are formed.

20 Claims, 3 Drawing Sheets

(51) Int. Cl.
    *G01M 5/00*     (2006.01)
    *E01D 1/00*     (2006.01)
    *E01D 101/26*     (2006.01)

(52) U.S. Cl.
    CPC .............. *G01N 2203/0005* (2013.01); *G01N 2203/0073* (2013.01)

(58) Field of Classification Search
    CPC ............. G01N 3/32; G01N 2203/0005; G01N 2203/0073; G01N 3/08; E01D 1/00; E01D 2101/26; E01D 22/00; E01D 2/00; E04C 2/06; E04C 5/12; E01B 3/34
    See application file for complete search history.

(56) References Cited

FOREIGN PATENT DOCUMENTS

| | | | |
|---|---|---|---|
| CN | 105893689 A | * | 8/2016 |
| CN | 106485029 | | 3/2017 |
| CN | 108225906 | | 6/2018 |
| CN | 108416110 | | 8/2018 |
| CN | 109030333 | | 12/2018 |
| KR | 101791878 | | 10/2017 |

OTHER PUBLICATIONS

Yafei Ma, et al., "Fatigue life prediction for aging RC beams considering corrosive environments," Engineering Structures, vol. 79, Jul. 2014, pp. 211-221.

* cited by examiner

METHOD AND SYSTEM FOR PREDICTING CORROSION FATIGUE LIFE OF PRESTRESSED CONCRETE BRIDGES

CROSS-REFERENCE TO RELATED APPLICATION

This application is a 371 of international application of PCT application serial no. PCT/CN2019/096061, filed on Jul. 16, 2019, which claims the priority benefit of China application no. 201810977815.3, filed on Aug. 27, 2018. The entirety of each of the above mentioned patent applications is hereby incorporated by reference herein and made a part of this specification.

BACKGROUND

Technical Field

The invention relates to the field of safety assessment of in-service bridges, and in particular, to a method and a system for predicting the corrosion fatigue life of prestressed concrete bridges.

Related Art

Prestressed concrete bridges have a strong span capability, which account for a large proportion in highway bridges. In recent years, the durability problem gradually appears in such type of bridges. For a post-tensioned prestressed concrete bridge, in a construction technology, grouting is required after tension of strands. However, in early construction of the post-tensioned prestressed concrete bridges, insufficient grouting generally occurs as a result of the imperfect grouting technique or the constructional deficiency. Insufficient grouting accelerates the invasion of corrosive ions and leads to corrosion of strands. Corrosion decreases the cross-section area of strands, and therefore increase sits actual stress amplitude. In addition, an in-service bridge repeatedly bears continuously increasing vehicle loads that will accelerate the damage accumulation of the bridge. The combined action of corrosion and fatigue significantly increases the failure probability of an in-service bridge.

At present, the widely used residual fatigue life prediction of prestressed concrete bridges are based on the empirical formula obtained from laboratory fatigue test. However, some factors such as the degeneration of elastic modulus of concrete, an increased stress on strands, and the interaction of corrosion and fatigue are not considered. Fatigue life prediction considering these factors simultaneously is a very complicated work. In laboratory fatigue test, the failure of test beams often initiates with the fracture of longitudinal tension bars. With an increase of corrosion level, the fatigue failure gradually turns to strands fracture. How to effectively consider strands corrosion, vehicle loads, degeneration of elastic modulus of concrete, and stress concentration in fatigue life prediction is urgent to be resolved.

SUMMARY

A technical problem to be resolved in the invention is to provide a method and a system for predicting the corrosion fatigue life of prestressed concrete bridges that are proper, highly adaptable, and closer to actual damage evolution of the bridge to overcome a disadvantage of the prior art.

In order to resolve the foregoing technical problem, a technical solution used in this invention is a method for predicting the corrosion fatigue life of prestressed concrete bridges, including the following steps:

step 1: calculating the elastic strain and plastic strain of concrete in compression zone under fatigue load, and calculating the continuously degenerating elastic modulus of concrete;

step 2: representing a corrosion rate of the strand using a corrosion current density and predicting the mass loss of strands; calculating the residual effective tension force of strands;

calculating an elastic strain of the strand caused by the fatigue load according to a deformation coordination condition, degeneration of the elastic modulus of the concrete, and an influence on a strain growth of the strand from stress concentration caused by pitting corrosion; and calculating an irrecoverable plastic strain of the strand according to an influence of the plastic strain of concrete in compression zone, to obtain a stress of the strand under a combined action of corrosion and fatigue;

step 3: obtaining an initial stress of longitudinal tension bars according to an influence of tension and anchoring of the strand on a prestress of the longitudinal tension bars; calculating the elastic stress of longitudinal tension bars under fatigue load; and calculating a plastic stress of a longitudinal tension bar according to an influence of the plastic strain of the concrete in the compression zone, to obtain a total stress of the longitudinal tension bar under the combined action of corrosion and fatigue; and step 4: performing real time stress-strain calculation on the concrete, the longitudinal tension bar and the strand in response to an increased fatigue load, and determining the failure modes of a structure based on a stress-strain growth relationship model and the failure criterion of concrete, longitudinal tension bar and strand, to evaluate the fatigue life of structures.

Step 1 includes the following.

Under fatigue load, the strain of the concrete in the compression zone includes an elastic strain $\varepsilon_{ce}^n$ and an irrecoverable plastic strain $\varepsilon_{cp}^n$.

First, the elastic strain $\varepsilon_{ce}^n$ of the edge of the concrete compression zone is calculated as:

$$\varepsilon_{ce}^n = \frac{(M_p^n - M_n^{n-1})x_n}{E_e^{n-1} I_{cr}^n}. \tag{1}$$

where $E_c^{n-1}$ and $M_0^{n-1}$ are elastic modulus of concrete and the bending moment effect caused by an effective tension force of the strand after (n−1) times of fatigue load, respectively, and $M_p^n$, $x_n$ and $I_{cr}^n$, are the cross-section bending moment, the height of the compression zone, and the inertia moment of the cracked cross-section caused by vehicle load after n times of fatigue cycles, respectively. For $x_n$, refer to the method for calculating the height of the compression zone in partially prestressed concrete-bending member.

The strain of concrete includes an elastic strain and a plastic strain. An influence of a variable stress process on degeneration of the elastic modulus of concrete is considered, to quantify the strain growth mechanism of the concrete.

The inertia moment of the cracked cross-section can be expressed as:

$$I_{cr}^n = \frac{1}{3} b y_n^3 + \alpha_{EP}^n A_{p,e}^n (h_p - y_n)^2 + \alpha_{ES}^n A_{s,e}^n (h_s - y_n)^2 + \alpha_{ES}^n A_{s,e}^n (y_n - a_s')^2 \tag{2},$$

where b is a width of the cross-section, $y_n$ is a distance between the neutral axis of the cracked cross-section and an edge of the concrete compression zone after n times of fatigue load, $h_s$, $h_p$, and $a_s'$ are distances from the center of longitudinal tension bar, the center of strand, and the center of compression steel bars to the edge of the compression zone of concrete respectively, (if longitudinal tension bar and strand have the same cross-section loss, $h_s$, $h_p$, and $a_s'$ are constant values in the fatigue period); $\alpha_{EP}^n$, and $\alpha_{ES}^n$ are the ratio of an elastic modulus of the strand to the elastic modulus of the concrete $E_c^{n-1}$, and the ratio of an elastic modulus of the longitudinal tension bar to the elastic modulus of the concrete $E_c^{n-1}$ after n times of fatigue load, respectively; $A_{p,e}^n$, $A_{s,e}^n$, and $A_{s,e}^n$ are the effective residual cross-sectional areas of strands, tension longitudinal bars, and the steel bars in the compression zone, respectively.

Secondly, the stress correlation coefficient $\alpha_{r,n}$ of the concrete in the compression zone after n times of fatigue load is calculated as follows:

$$\alpha_{r,n} = \frac{\sigma_{c,max,n}^f - \sigma_{c,min,n}^f}{f_c^0 - \sigma_{c,min,n}^f}, \tag{3}$$

where $\sigma_{c,max,n}^f$ and $\sigma_{c,min,n}^f$ are maximum and minimum elastic stress of the edge of the compression zone after n times of fatigue load, respectively $\sigma_{c,max,n}^f = E_c^{n-1}\varepsilon_{ce,max}^n$ and $\sigma_{c,min,n}^f = E_c^{n-1}\varepsilon_{ce,min}^n$.

A plastic strain $\varepsilon_{cp}^n$ of the edge of the concrete compression zone is:

$$\varepsilon_{cp}^n = \frac{f_c^0}{E_c^0}\left\{\sum_{i=1}^n n_i \left[\lg^1(4.0935\alpha_{r,i} - 8.5576)\right]\right\}^{0.8382}, \tag{4}$$

where $f_c^0$ is an initial compressive strength of concrete; $E_c^0$ is an initial elastic modulus of concrete; $n_i$ is the number of the $i^{th}$ fatigue load (n is related to a vehicle load and is a function of t).

Then, the elastic modulus of the concrete after n times of fatigue load is obtained as follows:

$$E_c^n = \frac{\sigma_{c,max,n}^f}{\frac{\sigma_{c,max,n}^f}{\beta E_c^0} + \frac{f_c^0}{E_c^0}\left\{\sum_{i=1}^n n_i\left[\lg^1(4.0935 \cdot \alpha_{r,i} - 8.5576)\right]\right\}^{0.5382}}, \tag{5}$$

where $E_c^n$ is the elastic modulus of the concrete after n times of fatigue load; correction coefficient $\beta$ is a statistical result (for C20-C50, $\beta=0.61$, and for C60-C70, $\beta=0.875$).

A failure criterion for the concrete in the compression zone is as follows:

$$\varepsilon_{cp}^n \geq 0.4\varepsilon_{c0} \tag{6},$$

where $\varepsilon_{c0}$ is an ultimate compressive strain of the concrete under static load.

Step 2 includes the following.

A peak stress $\sigma_{p,max}^n$ of the strand under fatigue load has three items: an initial tensile stress $\sigma_{p0}^n$ caused by a residual effective tension force $T_{\rho_{m,p,t}}$ at a time t, an elastic stress $\sigma_{p1}^n$ caused by fatigue load and pitting corrosion-induced stress concentration, and a stress $\sigma_{p2}^n$ caused by plastic deformation of the concrete in the compression zone.

A mass loss rate can be expressed as:

$$\rho_{m,t} = \frac{1.169 \times 10^{-5}}{L} \cdot R \int_0^t i_{ccor}(t)dt, \tag{7}$$

where $i_{ccor}$ is a corrosion current density; L is a corrosion length; R is a corrosion variation coefficient for different types of steel bars in the structure. For the strand, R=1.

The residual effective tension force $T_{\rho_{m,p,t}}$ at the time t is:

$$T_{\rho_{m,p,t}} = E_P\varepsilon_P(1-\rho_{m,p,t})A_P \approx (1-\rho_{m,p,t}) \cdot T_0 \tag{8},$$

where $E_P$ and $\varepsilon_P$ are an elastic modulus and a strain of an uncorroded strand, and $T_0$ is an initial tension force, respectively.

A fatigue crack generally appears at the corrosion pit location of strand under fatigue load, and the fatigue crack continuously grows until the strand fractures. If the strand fractures after N times of fatigue load, a residual effective cross-sectional area of the strand is $A_{p,e}^N$, and a total area loss of the strand is $(A_p - A_{p,e}^N)$. A maximum stress of the strand under the $n^{th}$ time of fatigue load is denoted as $\sigma_{p,max,n}$, and therefore the residual effective cross-sectional area of the strand after fatigue fracture under the characteristic load is:

$$A_{p,e}^N = A_p \cdot \frac{\sigma_{p,max,n}}{f_u}, \tag{9}$$

where $f_u$ is the ultimate tensile strength of strand.

It is assumed that an area of strand decreases linearly with the fatigue load. After n times of fatigue load, the residual cross-sectional area of strand $A_{p,e}^n$ is:

$$A_{p,e}^n = A_p - \sum_{k=1}^n \frac{1}{N_{k-1}}(A_p - A_{p,e}^{k-1}), \tag{10}$$

where $N_{k-1}$ is a life value corresponding to the S-N curve of the strand under a stress amplitude after $(k-1)^{th}$ time of fatigue load.

At the time t, the tensile stress $\sigma_{p,0}^n$; of the strand caused by the residual effective tension force $T_{\rho_{m,p,t}}$ is:

$$\sigma_{p0}^n = T_{\rho_{m,p,t}}/A_{p,e}^n \tag{11}.$$

A decrease of the residual cross-sectional area of the strand and the degeneration of the elastic modulus of concrete in the compression zone lead to stress redistribution, and the height of the compression zone, the stress-strain relationships of strand and longitudinal tension bar change accordingly.

The elasticity of the strand $\sigma_{p1}^n$ caused by fatigue load is:

$$\sigma_{p1}^n = E_p \frac{\varepsilon_{ce}^n(h_p - x_n)}{x_n} \cdot k_t, \tag{12}$$

where $k_t$ is a stress concentration coefficient caused by pitting corrosion.

After n times of fatigue load, the plastic strain of concrete at the edge of compression zone is $\varepsilon_{cp}^n$, and the height of the compression zone is $x_n$. The plastic strain of the strand caused by $\varepsilon_{cp}^n$ can be obtained according to the plane section assumption and the deformation coordination condition between concrete and strand:

$$\varepsilon_{pp}^n = \varepsilon_{cp}^n \cdot \frac{h_p - x_n}{x_n}. \tag{13}$$

The stress of the strand $\sigma_{p2}{}^n$ caused by plastic deformation of the concrete in the compression zone is:

$$\sigma_{p2}{}^n = E_p \cdot \varepsilon_{pp}{}^n \tag{14}$$

The stress of the strand $\sigma_{p,max}{}^n$ can be expressed as:

$$\sigma_{p,max}{}^n = \sigma_{p0}{}^n + \sigma_{p1}{}^n + \sigma_{p2}{}^n \tag{15}$$

A failure criterion for the strand is as follows:

$$\sigma_{p,max}{}^n > f_u \tag{16}$$

In the invention, the reduction of the residual effective tension force of the corroded is considered. The area loss of the strand is used as a fatigue damage parameter, and the stress concentration effect caused by non-uniform pitting corrosion of the strand is considered. The total stress of the strand includes three items, and each item is a dynamic process varying with time and load.

Step 3 includes the following.

The peak stress of the longitudinal tension bar $\sigma_{s,max}{}^n$ under fatigue load has three items: a compressive stress $\alpha_{s0}{}^n$ of the longitudinal tension bar caused by the residual effective tension force of the strand $T_{p_{m,R,t}}$ at the time t; the elastic stress $\sigma_{s1}{}^n$, caused by the fatigue load; and the stress $\sigma_{s2}{}^n$ caused by the plastic deformation of the concrete in the compression zone.

Because the action of the effective tension force of the strand (that is, $M_0{}^{n1}$) has been considered during the calculation of the elastic strain of concrete, $\sigma_{s0}{}^n$ is denoted as 0 to avoid repetition.

The elastic stress $\sigma_{s1}{}^n$ of the longitudinal tension bar caused by fatigue load is:

$$\sigma_{s1}^n = E_s \frac{\varepsilon_{ce}^n (h_p - x_n)}{x_n} \cdot k_t \tag{17}$$

The plastic strain of the longitudinal tension bar caused by $\varepsilon_{cp}{}^n$, can be obtained according to the plane section assumption and the deformation coordination condition between concrete and steel bars.

$$\varepsilon_{sp}^n = \varepsilon_{cp}^n \cdot \frac{h_s - x_n}{x_n} \tag{18}$$

The stress $\sigma_{s2}{}^n$ of the longitudinal tension bar caused by plastic deformation of the concrete in the compression zone is:

$$\sigma_{s2}{}^n = E_s \cdot \varepsilon_{sp}{}^n \tag{19}$$

The stress $\sigma_{s,max}{}^n$ of the longitudinal tension bar is as follows:

$$\sigma_{s,max}{}^n = -\sigma_{s0}{}^n + \sigma_{s1}{}^n + \sigma_{s2}{}^n \tag{20}$$

A failure criterion for the longitudinal tension bar is as follows:

$$\sigma_{s,max}{}^n \geq f_y \tag{21}$$

where $f_y$ is the yield strength of longitudinal tension bar.

In the invention, because a structural failure may start from the fracture of longitudinal tension bar, the stress of the longitudinal tension bar is divided into three sections. Similarly, each section changes dynamically.

Step 4 includes the following.

A process of calculating the fatigue life of prestressed concrete bridge is as follows. First, for given n, the stress calculation formulas (5), (15) and (20) of the concrete, the strand, and the longitudinal tension bar are substituted into an equilibrium equation (an internal force equilibrium equation and a moment equilibrium equation) to obtain corresponding stress values; and then it is determined whether the structure encounters a fatigue failure based on the failure criteria of materials in the formulas (6), (16) and (21); if the structure does not fail, increasing n and repeating the above steps, and so on, to perform cyclic iterative calculation until a material fails. Current fatigue cycles n is the fatigue life of the structure.

Accordingly, the invention further provides a system for predicting the corrosion fatigue life of prestressed concrete bridges, including:

a calculating unit configured to: calculate a continuously degenerating elastic strain $\varepsilon_{ce}{}^n$, and irrecoverable plastic strain $\varepsilon_{cp}{}^n$ at the edge of concrete in the compression zone under fatigue load and a degenerated elastic modulus of concrete;

a predicting unit configured to: predict a corrosion level of a strand to obtain a residual tension force of structure, and calculate continuously-increasing strand stress $\sigma_{p,max}{}^n$ and longitudinal tension bar stress $\sigma_{s,max}{}^n$ in a tensile region under a coupled action of corrosion and fatigue using the elastic strain $\varepsilon_{ce}{}^n$, the irrecoverable plastic strain $\varepsilon_{cp}{}^n$, and the degenerated elastic modulus of the concrete and using a cross-section loss of a corroded strand as a fatigue damage parameter; and an evaluating unit configured to: perform real time stress-strain calculation on the concrete, the longitudinal tension bar, and the strand in response to an increased number of fatigue load cycles, and determine a failure mode of the structure based on a stress-strain growth relationship model and the failure criteria of concrete, a longitudinal tension bar, and a strand, to evaluate a fatigue life of the structure, where the evaluating unit specifically implements the following operations:

a): under typical fatigue load, when n=1, calculating the irrecoverable plastic strain $\varepsilon_{cp}{}^n$ of the concrete, a total stress value $\sigma_{p,max}{}^n$ of the strand, and a total stress value $\sigma_{s,max}{}^n$ of the longitudinal tension bar, where n is the number of fatigue cycles;

b): determining whether a beam encounters a fatigue failure according to the fatigue failure criteria for the component materials in the following formulas, where the failure criterion for the concrete in the compression zone is $\varepsilon_{cp}{}^n \geq 0.4\varepsilon_{c0}$, and $\varepsilon_{c0}$ is an ultimate compressive strain of the concrete under static load; the failure criterion for the stand is $\sigma_{p,max}{}^n > f_u$, and $f_u$ is the ultimate tensile strength of a strand; and the failure criterion for the longitudinal tension bar is $\sigma_{s,max}{}^n \geq f_y$, and $f_y$ is the yield strength of the longitudinal tension bar; and c): if the beam does not fail, increasing n, and repeating steps a) and b) until a material fails, where the current fatigue cycles n is the fatigue life of the structure.

A load effect of a key cross-section is obtained based on the vehicle load information, and the stresses of the strand, the longitudinal tension bar and the concrete under the coupled effect of corrosion and actual load are cyclically calculated. The corrosion fatigue life of the structure is assessed based on the failure criteria of materials.

The technical effects of the invention are as follows. For a prestressed concrete bridge structure with insufficient grouting, the peak stress of the strand and the longitudinal tension bar are respectively divided into three sections considering the factors such as corrosion of the strand, stress concentration, degeneration of elastic modulus of the concrete, a residual strain, etc. and stress growth models of the strand and the longitudinal tension bar are proposed; and a vehicle load is incorporated, so that a set of methods for analyzing the fatigue life of the prestressed concrete bridge subjected to corrosive environment and vehicle load are formed. The method is proper, high adaptable, and closer to actual damage evolution of a bridge, and can be used to provide effective support for the fatigue life assessment of an in-service prestressed concrete bridge.

BRIEF DESCRIPTION OF THE DRAWINGS

In FIG. 2, $\varepsilon_{p,0}{}^n$ is the strain of the strand under a residual effective tension force; $\varepsilon_{p,1}{}^n$ and $\varepsilon_{s1}{}^n$ are an elastic strain of the strand and an elastic strain of the longitudinal tension bar under fatigue load, respectively; and $\varepsilon_{p2}{}^n$ and $\varepsilon_{p2}{}^n$ are an irrecoverable plastic strain of the strand, and an irrecoverable plastic strain of the longitudinal tension bar caused by plastic deformation of concrete in a compression zone, respectively.

DETAILED DESCRIPTION (1). An elastic strain of concrete in compression zone under fatigue load is determined. First, the elastic strain $\varepsilon_{ce}{}^n$ of a top of the concrete compression zone is calculated as:

$$\varepsilon_{ce}^n = \frac{(M_p^n - M_0^{n-1})x_n}{E_c^{n-1} I_{cr}^n}. \tag{1}$$

where $E_c^{n-1}$ and $M_0^{n-1}$ are elastic modulus of concrete and the bending moment effect caused by an effective tension force of the strand after (n−1) times of fatigue load, respectively, and $M_p^n$, $x_n$ and $I_{cr}^n$ are the cross-section bending moment, the height of the compression zone, and the inertia moment of the cracked cross-section caused by vehicle load after n times of fatigue cycles, respectively. For $x_n$, refer to the method for calculating the height of the compression zone in partially prestressed concrete-bending member.

The inertia moment of the cracked cross-section can be expressed as:

$$I_{cr}^n = \tfrac{1}{3} b y_n^3 + \alpha_{EP}^n A_{p,e}^n (h_p - y_n)^2 + \alpha_{ES}^n A_{s,e}^n (h_s - y_n)^2 + \alpha_{ES}^n A_{s,e}^n (y_n - a_s')^2 \tag{2},$$

where b is a width of the cross-section, $y_n$ is a distance between the neutral axis of the cracked cross-section and an edge of the concrete compression zone after n times of fatigue load, $h_s$, $h_p$, and $a_s'$ are distances from the center of longitudinal tension bar, the center of strand, and the center of compression steel bars to the edge of the compression zone of concrete respectively, (if longitudinal tension bar and strand have the same cross-section loss, $h_s$, $h_p$, and $a_s'$ are constant values in the fatigue period); $\alpha_{EP}^n$, and $\alpha_{ES}^n$ are the ratio of an elastic modulus of the strand to the elastic modulus of the concrete $E_c^{n-1}$, and the ratio of an elastic modulus of the longitudinal tension bar to the elastic modulus of the concrete $E_c^{n-1}$ after n times of fatigue load, respectively; $A_{p,e}^n$, $A_{s,e}^n$, and $A_{s,e}^n$ are the effective residual cross-sectional areas of strands, tension longitudinal bars, and the steel bars in the compression zone, respectively.

A stress correlation coefficient $\alpha_{r,n}$ of the concrete in the compression zone after n times of fatigue load is calculated as follows:

$$\alpha_{r,n} = \frac{\sigma_{c,max,n}^f - \sigma_{c,min,n}^f}{f_c^0 - \sigma_{c,min,n}^f}. \tag{3}$$

where $\sigma_{c,max,n}{}^f$ and $\sigma_{c,min,n}{}^f$ are maximum and minimum elastic stress of the edge of the compression zone after n times of fatigue load, respectively, $\sigma_{c,max,n}{}^f = E_c^{n-1} \varepsilon_{ce,max}{}^n$ and $\sigma_{c,min,n}{}^f = E_c^{n-1} \varepsilon_{ce,min}{}^n$.

An irrecoverable plastic strain $\varepsilon_c$, of the edge of the concrete compression zone is:

$$\varepsilon_{cp}^n = \frac{f_c^0}{E_c^0} \left\{ \sum_{i=1}^n n_i \left[ 1g^{-1}(4.0935 \alpha_{r,i} - 8.5576) \right] \right\}^{0.8382}, \tag{4}$$

where $f_c^0$ is an initial compressive strength of concrete; $E_c^0$ is an initial elastic modulus of concrete; $n_i$ is the number of the $i^{th}$ fatigue load (n is related to a vehicle load and is a function of t).

Then, the elastic modulus of the concrete after n times of fatigue load is obtained as follows:

$$E_c^n = \frac{\sigma_{c,max,n}^f}{\dfrac{\sigma_{c,max,n}^f}{\beta E_c^0} + \dfrac{f_c^0}{E_c^0} \left\{ \sum_{i=1}^n n_i \left[ 1g^{-1}(4.0935 \cdot \alpha_{r,i} - 8.5576) \right] \right\}^{0.5382}}, \tag{5}$$

where $E_c^n$ is the elastic modulus of the concrete after n times of fatigue load; correction coefficient β is a statistical result (for C20-050, β=0.61, and for C60-C70, β=0.875).

When the irrecoverable plastic strain of the concrete meets the following formula, it is determined that the concrete collapses and the structure cannot bear a load any more:

$$\varepsilon_{cp}^n \geq 0.4 \varepsilon_{c0}^n \tag{6},$$

where $\varepsilon_{c0}$ is an ultimate compressive strain of the concrete under static load.

(2). A residual effective tension force after strand corrosion is determined.

The strand forms a weak corrosion current under a corrosive environment. A corrosion rate of the strand is represented using a corrosion current as:

$$\rho_{m,t} = \frac{1.169 \times 10^{-5}}{L} \cdot R \int_0^t i_{ccor}(t)dt, \tag{7}$$

where $i_{cor}$ is a corrosion current density; L is a corrosion length; R is a corrosion variation coefficient for different types of steel bars in the structure. For the strand, R=1.

An area loss of the strand leads to a decrease of a prestress. A residual effective prestressed value $T_{\rho m,t}$ at the time t is:

$$T_{\rho m,t} = E_P \varepsilon_P (1 - \rho_{m,p,t}) A_P \approx (1 - \rho_{m,p,t}) \cdot T_0 \tag{8},$$

where $E_P$ and $\varepsilon_P$ are an elastic modulus and a strain of an uncorroded strand, and $T_0$ is an initial tension force, respectively.

(3). A residual effective area of the strand under fatigue load is determined.

A fatigue crack generally appears at the corrosion pit location of strand under fatigue load, and the fatigue crack continuously grows until the strand fractures. If the strand fractures after N times of fatigue load, a residual effective cross-sectional area of the strand is $A_{p,e}^N$, a total loss area of the strand is $(A_p - A_{p,e}^N)$. A maximum stress of the strand under the $n^{th}$ time of load is denoted as $\sigma_{p,min,n}$, and therefore the residual effective cross-sectional area of the strand after fatigue fracture under the characteristic load is:

$$A_{p,e}^n = A_p \cdot \frac{\sigma_{p,max,n}}{f_u}, \quad (9)$$

where $f_u$ is the ultimate tensile strength of strand.

It is assumed that an area of the strand decreases linearly with the fatigue load. After n times of fatigue load, the residual cross-sectional area $A_{p,e}^n$ of the strand is:

$$A_{p,e}^n = A_p - \sum_{k=1}^{n} \frac{1}{N_{k-1}} \left( A_p - A_{p,e}^{k-1} \right), \quad (10)$$

where $N_{k-1}$ is a life value corresponding to the S-N curve of the strand under a stress amplitude after $(k-1)^{th}$ time of fatigue load.

(4) Three items of the peak stress value of the strand are determined.

The peak stress value of the strand includes three items: a tensile stress $\sigma_{p0}^n$ caused by the residual effective tension force $T_{\rho m,t}$ at the time t, an elastic stress $\sigma_{p1}^n$ caused by fatigue load and pitting corrosion-induced stress concentration, and a stress $\sigma_{p2}^n$ caused by plastic deformation of the concrete in the compression zone.

At the time t, the tensile stress $\sigma_{p,0}^n$ of the strand caused by the residual effective tension force $T_{\rho_{m,p,t}}$ is:

$$\sigma_{p0}^n = T_{\rho_{m,p,t}} / A_{p,e}^n \quad (11).$$

A decrease of the residual effective area of the strand and the degeneration of the elastic modulus of concrete in the compression zone lead to stress redistribution, and the height of the compression zone, the stress-strain relationships between strand and longitudinal tension bar change accordingly.

The elasticity of the strand $\sigma_{p1}^n$ caused by fatigue load is:

$$\sigma_{p1}^n = E_p \frac{\varepsilon_{ce}^n (h_p - x_n)}{x_n} \cdot k_t \quad (12)$$

where $k_t$ is a stress concentration coefficient caused by pitting corrosion.

After n times of fatigue load, the plastic strain of concrete at the edge of the compression zone $\varepsilon_{cp}^n$, and the height of the compression zone is $x_n$. The plastic strain of the strand caused by $\varepsilon_{cp}^n$ can can be obtained according to the plane section assumption and the deformation coordination condition between concrete and strand:

$$\varepsilon_{pp}^n = \varepsilon_{cp}^n \cdot \frac{h_p - x_n}{x_n}. \quad (13)$$

The stress $\sigma_{p2}^n$, of the strand caused by plastic deformation of the concrete in the compression zone is:

$$\sigma_{p2}^n = E_p \cdot \varepsilon_{pp}^n \quad (14).$$

The stress of the strand $\sigma_{p,max}^n$ can be expressed as:

$$\sigma_{p,max}^n = \sigma_{p0}^n + \sigma_{p1}^n + \sigma_{p2}^n \quad (15).$$

A failure criterion for the strand is as follows:

$$\sigma_{p,max}^n > f_u \quad (16).$$

(5). Three peak stress values of a longitudinal tension bar are determined.

The peak stress value of the longitudinal tension bar includes three items: a compressive stress $\sigma_{s,0}$ of the longitudinal tension bar caused by the residual effective tension force of the strand $T_{\rho_{m,p,t}}$ at the time t; the elastic stress $\sigma_{s1}^n$, caused by the fatigue load; and the stress $\sigma_{s2}^n$ caused by the plastic deformation of the concrete in the compression zone.

Because the action of the effective tension force of the strand (that is, $M_0^{n1}$) has been considered during the calculation of the elastic strain of concrete, $\sigma_{s0}^n$ is denoted as 0 to avoid repetition.

The elastic stress $\sigma_{s1}^n$ of the longitudinal tension bar caused by fatigue load is:

$$\sigma_{s1}^n = E_s \frac{\varepsilon_{ce}^n (h_p - x_n)}{x_n} \cdot k_t \quad (17)$$

The plastic strain of the longitudinal tension bar caused by $\varepsilon_{cp}^n$, can be obtained according to the plane section assumption and the deformation coordination condition between concrete and steel bars.

$$\varepsilon_{sp}^n = \varepsilon_{cp}^n \cdot \frac{h_s - x_n}{x_n}. \quad (18)$$

The stress $\sigma_{s2}^n$ of the longitudinal tension bar caused by plastic deformation of the concrete in the compression zone is:

$$\sigma_{s2}^n = E_s \cdot \varepsilon_{sp}^n \quad (19).$$

The stress $\sigma_{s,max}^n$ of the longitudinal tension bar is as follows:

$$\sigma_{s,max}^n = -\sigma_{s0}^n + \sigma_{s1}^n + \sigma_{s2}^n \quad (20).$$

A failure criterion for the longitudinal tension bar is as follows:

$$\sigma_{s,max}^n \geq f_y \quad (21).$$

where $f_y$ is the yield strength of longitudinal tension bar.

(6). A failure mode of a structure is determined to predict a fatigue life.

Figure 1:
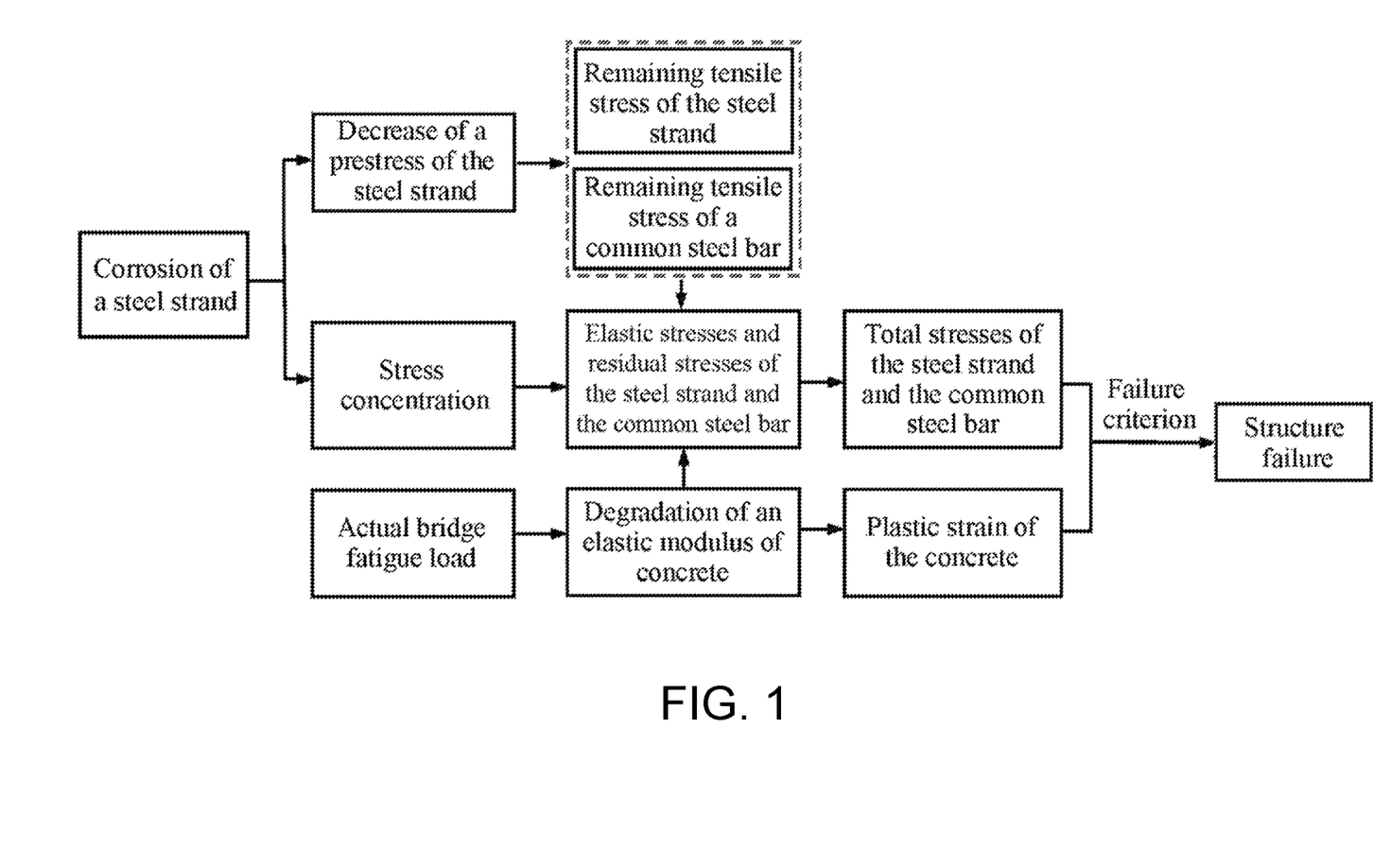
FIG. 1 is an overall schematic diagram of fatigue life assessment according to the invention.
Figure 2:
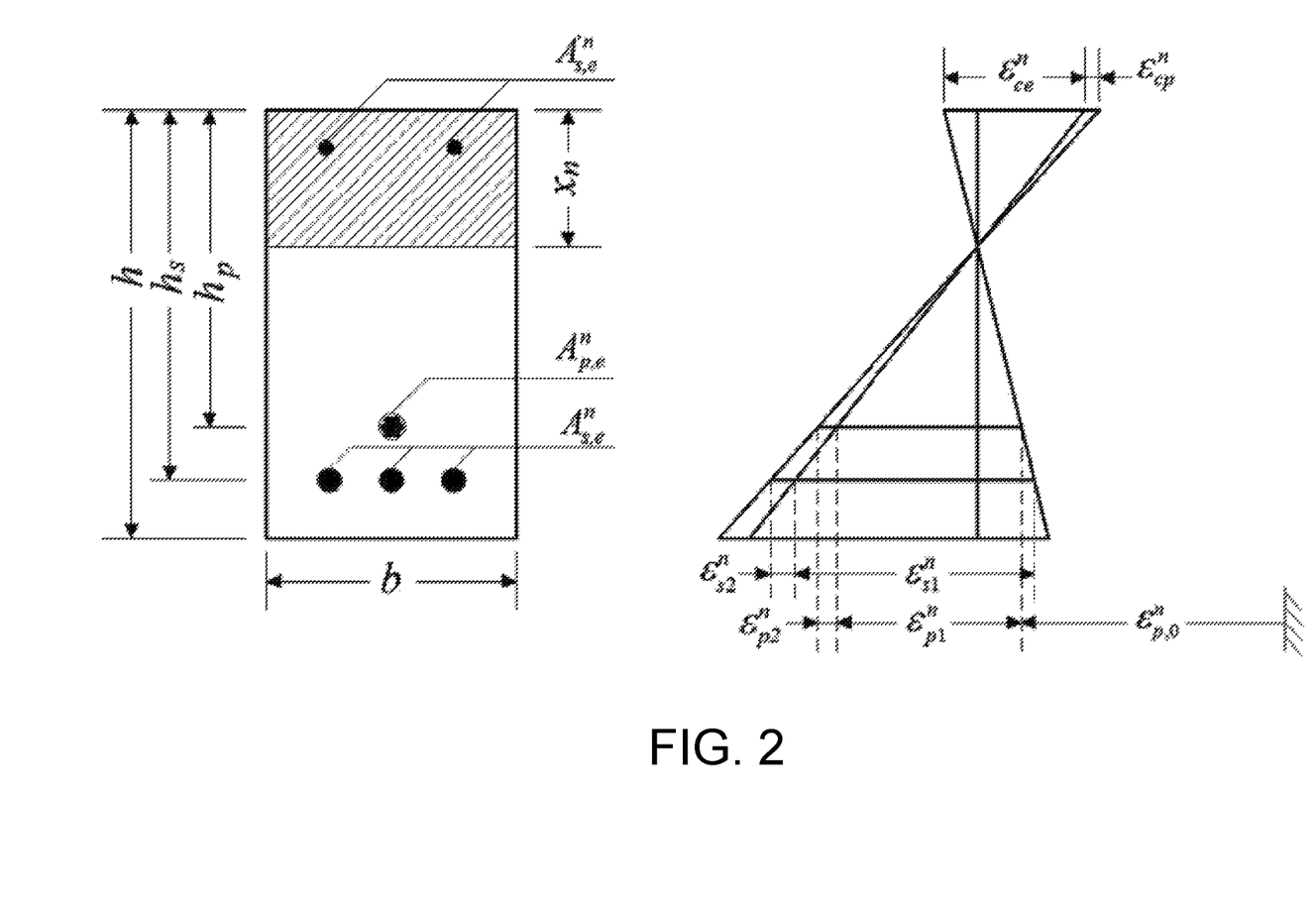
FIG. 2 is a schematic diagram of strains of concrete, a longitudinal tension bar, and a strand.
Figure 3:
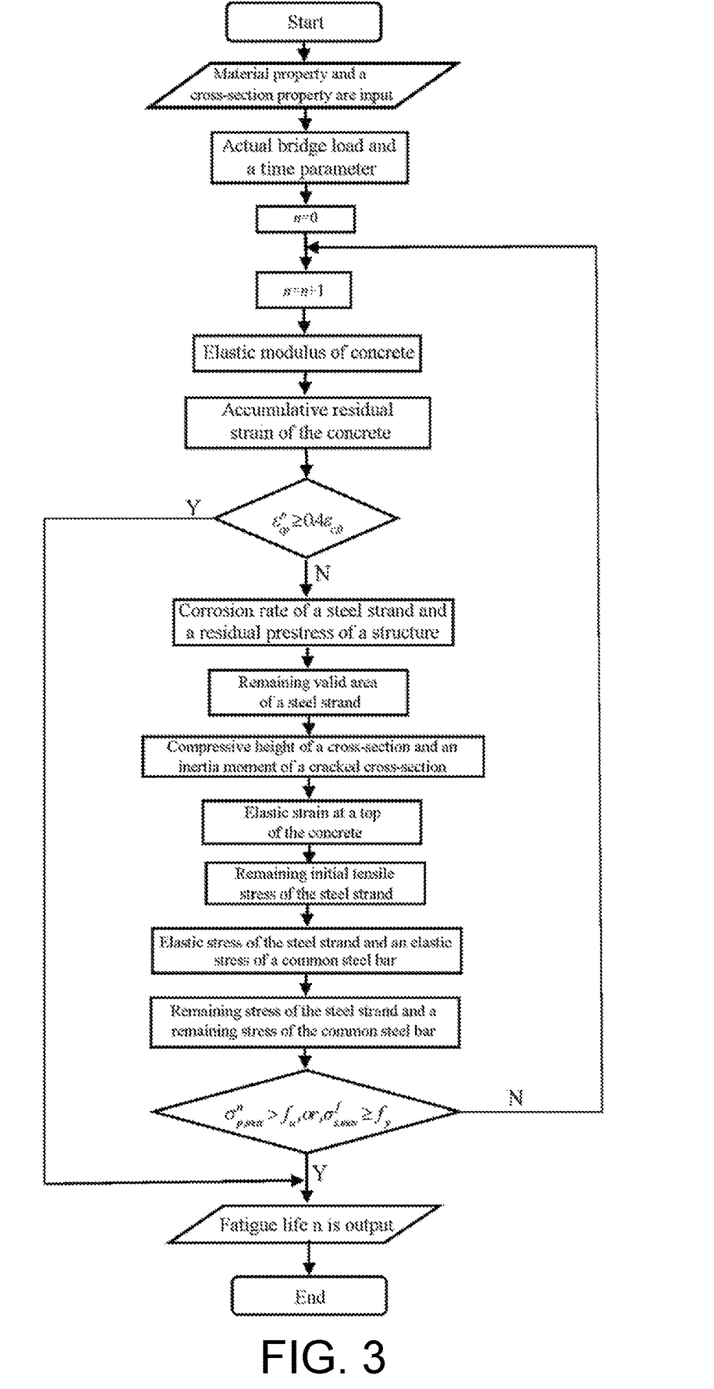
FIG. 3 is a calculating flowchart according to the invention.

A process of calculating the fatigue life of prestressed concrete bridge is as follows. First, for given n, the stress calculation formulas (5), (15) and (20) of the concrete, the strand, and the longitudinal tension bar are substituted into an equilibrium equation (an internal force equilibrium equation and a moment equilibrium equation) to obtain corresponding stress values; and then it is determined whether the structure encounters a fatigue failure based on the failure determining criteria of materials in the formulas (6), (16) and (21); if the structure does not fail, increasing n and repeating the above steps, and so on, to perform cyclic iterative calculation until one of the three types of materials fails. In this case, the structure fails. Current fatigue cyclic n is the fatigue the structure can bear, and a time t corresponding to n is the fatigue life of the structure.

What is claimed is:

1. A method for predicting a corrosion fatigue life of prestressed concrete bridges, comprising the following steps:
   1) calculating a continuously degenerating elastic strain $\varepsilon_{ce}^n$ and an irrecoverable plastic strain $\varepsilon_{cp}^n$, at a edge of the concrete in a compression zone under a fatigue load, and a degenerated elastic modulus of the concrete;
   2) predicting a corrosion level of a strand to obtain a residual tension force of a structure, and calculating a continuously-increasing strand stress $\sigma_{p,max}^n$ and a longitudinal tension bar stress $\sigma_{s,max}^n$, in a tensile region under a coupled action of corrosion and fatigue using the elastic strain $\varepsilon_{ce}^n$, the irrecoverable plastic strain $\varepsilon_{cp}^n$, and a degenerated elastic modulus of the concrete and using a cross-section loss of a corroded strand as a fatigue damage parameter; and
   3) performing a real time stress-strain calculation on the concrete, the longitudinal tension bar, and the strand in response to an increased quantity of times of the fatigue load, and determining a failure mode of the structure based on a stress-strain growth relationship model and the failure criteria of the concrete, a longitudinal tension bar, and a strand, to evaluate a fatigue life of the structure.

2. The method for predicting the corrosion fatigue life of the prestressed concrete bridges according to claim 1, wherein in step 1), the elastic strain at an edge of the compression zone under the fatigue load is $$\varepsilon_{ce}^n = \frac{(M_p^n - M_0^{n-1})x_n}{E_c^{n-1}I_{cr}^n},$$

$E_c^{n-1}$ and $M_0^{n-1}$ are an elastic modulus of the concrete and a bending moment effect caused by an effective tension force of the strand after (n−1) times of the fatigue load, respectively, and $M_p^n$, $x_n$, and $I_{cr}^n$ are a cross-section bending moment, a height of the compression zone, and an inertia moment of a cracked cross-section caused by a vehicle load after n times of fatigue cycles, respectively; and the irrecoverable plastic strain $\varepsilon_{cp}^n$, at the edge of the compression zone is $$\varepsilon_{cp}^n = \frac{f_c^0}{E_c^0}\left\{\sum_{i=1}^{n} n_i[1g^{-1}(4.0935\alpha_{r,i} - 8.5576)]\right\}^{0.8382},$$

$f_c^0$ is an initial compressive strength of the concrete; $E_c^0$ is an initial elastic modulus of the concrete; $n_i$ is the number of the $i^{th}$ fatigue load, and $\alpha_{r,i}$ is a stress correlation coefficient at the edge of the compression zone after $i^{th}$-level fatigue.

3. The method for predicting the corrosion fatigue life of the prestressed concrete bridges according to claim 2, wherein an inertia moment $I_{cr}^n$ of the cracked cross-section is expressed as $I_{cr}^n = \frac{1}{3}by_n^3 + \alpha_{EP}^n A_{p,e}^n(h_p - y_n)^2 + \alpha_{ES}^n A_{s,e}^n(h_s - y_n)^2 + \alpha_{ES}^n A_{s,e}'^n(y_n - a_s')^2$, b is a width of the cross-section, $y_n$ is a distance between a neutral axis of the cracked cross-section and the edge of the compression zone of the concrete after n times of fatigue, $h_s$, $h_p$, and $a_s$ are respectively distances from a center of the longitudinal tension bar, a center of the strand, and a center of longitudinal compression bars to the edge of the compression zone of the concrete (if the longitudinal tension bar and the strands have a same cross-section loss in a diameter direction, $h_s$, $h_p$, and $a_s$ are constant values in a fatigue period); $\alpha_{EP}^n$ and $\alpha_{ES}^n$ are respectively a ratio of an elastic modulus of the strand to the elastic modulus $E_c^{n-1}$ of the concrete and a ratio of an elastic modulus of the longitudinal tension bar to the elastic modulus $E_c^{n-1}$ of the concrete after n times of fatigue; $A_{p,e}^n$, $A_{s,e}^n$, and $A'_{s,e}^n$, are respectively residual cross-sectional area of the strand, the longitudinal tension bar, and the longitudinal tension bar in the compression zone.

4. The method for predicting the corrosion fatigue life of the prestressed concrete bridges according to claim 3, wherein in step 2), the stress of the strand under the combined action of the corrosion and the fatigue is $\sigma_{p,max}^n = \sigma_{p0}^n + \sigma_{p1}^n + \sigma_{p2}^n$, $\sigma_{p0}^n$ is a tensile stress of the strand caused by a residual effective tension force $T_{P_{m,p,t}}$ at a time t, $\sigma_{p1}^n$ is an elastic stress of the strand caused by the fatigue load, and $\sigma_{p2}^n$ is a plastic stress of the strand caused by a plastic deformation of the concrete in the compression zone.

5. The method for predicting the corrosion fatigue life of the prestressed concrete bridges according to claim 4, wherein the residual effective tension force at the time t is $T_{P_{m,p,t}} = E_P \epsilon_P (1 - p_{m,p,t}) A_P \approx (1 - p_{m,p,t}) \cdot T_0$, and $E_p$ and $\epsilon_p$ are an elastic modulus and a strain of an uncorroded strand, and $T_0$ is an initial tension force, respectively;

$$\rho_{m,t} = \frac{1.169 \times 10^{-5}}{L} \cdot R \int_0^t i_{ccor}(t)dt,$$

R is a corrosion variation coefficient for different types of steel bars in the structure, $i_{ccor}$ is a corrosion current density, L is a corrosion length, and $A_p$ is an initial cross-section area of the strand.

6. The method for predicting the corrosion fatigue life of the prestressed concrete bridges according to claim 2, wherein in step 1), the elastic modulus of the concrete after n times of the fatigue is $$E_c^n = \frac{\sigma_{c,max,n}^f}{\frac{\sigma_{c,max,n}^f}{\beta E_c^0} + \frac{f_c^0}{E_c^0}\left\{\sum_{i=1}^{n} n_i[1g^{-1}(4.0935 \cdot \alpha_{r,i} - 8.5576)]\right\}^{05382}},$$

β is a correction coefficient, $f_c^0$ is an initial compressive strength of the concrete, $E_c^0$ is an initial elastic modulus of the concrete, and $n_i$ is a number of the $i^{th}$ fatigue load, wherein $\sigma_{c,max,n}^f = E_c^{n-1} \epsilon_{ce,max}^n$, $\epsilon_{ce,max}^n$ is a maximum value of the elastic strain; and $E_c^{n-1}$ is a elastic modulus of the concrete after (n−1) times of the fatigue load.

7. The method for predicting the corrosion fatigue life of the prestressed concrete bridges according to claim 2, wherein in step 2), the stress of the strand under the combined action of the corrosion and the fatigue is $\sigma_{p,max}^n = \sigma_{p0}^n + \sigma_{p1}^n + \sigma_{p2}^n$, $\sigma_{p0}^n$ is a tensile stress of the strand caused by a residual effective tension force $T_{P_{m,p,t}}$ at a time t, $\sigma_{p1}^n$ is an elastic stress of the strand caused by the fatigue load, and $\sigma_{p2}^n$ is a plastic stress of the strand caused by a plastic deformation of the concrete in the compression zone.

8. The method for predicting the corrosion fatigue life of the prestressed concrete bridges according to claim 7, wherein the residual effective tension force at the time t is $T_{P_{m,p,t}} = E_P \epsilon_P (1 - p_{m,p,t}) A_P \approx (1 - p_{m,p,t}) \cdot T_0$, $E_p$ and $\epsilon_p$ are an elastic modulus and a strain of an uncorroded strand, and $T_0$ is an initial tension force, respectively;

$$\rho_{m,t} = \frac{1.169 \times 10^{-5}}{L} \cdot R \int_0^t i_{ccor}(t)dt,$$

R is a corrosion variation coefficient for different types of steel bars in the structure, $i_{ccor}$ is a corrosion current density, L is a corrosion length, and $A_p$ is an initial cross-section area of the strand.

9. The method for predicting the corrosion fatigue life of the prestressed concrete bridges according to claim 7, wherein $\sigma_{p0}{}^n = T_{p_{m,p,t}}/A_{p,e}{}^n$; the residual cross-sectional area of the strand after n times of the fatigue is $$A_{p,e}^n = A_p - \sum_{k=1}^n \frac{1}{N_{k-1}}(A_p - A_{p,e}^{k-1}),$$

$N_{k-1}$ is a life value corresponding to the S-N curve of the strand under a stress amplitude after $(k-1)^{th}$ time of the fatigue load;

$$\sigma_{p1}^n = E_p \frac{\varepsilon_{ce}^n(h_p - x_n)}{x_n} \cdot k_t,$$

$k_t$ is a stress concentration coefficient caused by a pitting corrosion, $E_p$ is an elastic modulus of the uncorroded strand, $A_p$ is the initial cross-section area of the strand, $A_{p,e}{}^{k-1}$ is a remaining effective cross-section area of the strand after $(k-1)^{th}$ times of the fatigue load, $h_p$ is a distance from a center of the cross-section of the strand to the edge of the compression zone of the concrete, $\varepsilon_{cp}{}^n$ is an irrecoverable plastic strain of the concrete at the edge of the compression zone after n times of the fatigue load;

$$\varepsilon_{cp}^n = \frac{f_c^0}{E_c^0}\left\{\sum_{i=1}^n n_i[1g^{-1}(4.0935\alpha_{r,i} - 8.5576)]\right\}^{0.8382},$$

$f_c^0$ is an initial compressive strength of the concrete, $E_c^0$ is an initial elastic modulus of the concrete, $n_i$ is the number of the $i^{th}$ fatigue load, and $x_n$ is the height of the compression zone after n times of the fatigue load; and $\sigma_{p2}{}^n = E_p \cdot \varepsilon_{pp}{}^n$, and $$\varepsilon_{pp}^n = \varepsilon_{cp}^n \cdot \frac{h_p - x_n}{x_n},$$

$\varepsilon_{pp}{}^n$ is the plastic strain of the strand.

10. The method for predicting the corrosion fatigue life of the prestressed concrete bridges according to claim 1, wherein in step 1), the elastic modulus of the concrete after n times of the fatigue is $$E_c^n = \frac{\sigma_{c,max,n}^f}{\frac{\sigma_{c,max,n}^f}{\beta E_c^0} + \frac{f_c^0}{E_c^0}\left\{\sum_{i=1}^n n_i[1g^{-1}(4.0935 \cdot \alpha_{r,i} - 8.5576)]\right\}^{0.5382}},$$

$\beta$ is a correction coefficient, $f_c^0$ is an initial compressive strength of the concrete, $E_c^0$ is an initial elastic modulus of the concrete, and $n_i$ is a number of the $i^{th}$ fatigue load, wherein $\sigma_{c,max,n}^f = E_c^{n-1}\varepsilon_{ce,max}{}^n$, $\varepsilon_{ce,max}{}^n$ is a maximum value of the elastic strain; and $E_c^{n-1}$ is a elastic modulus of the concrete after $(n-1)$ times of the fatigue load.

11. The method for predicting the corrosion fatigue life of the prestressed concrete bridges according to claim 10, wherein in step 2), the stress of the strand under the combined action of the corrosion and the fatigue is $\sigma_{p,max}{}^n = \sigma_{p0}{}^n + \sigma_{p1}{}^n + \sigma_{p2}{}^n$, $\sigma_{p0}{}^n$ is a tensile stress of the strand caused by a residual effective tension force $T_{p_{m,p,t}}$ at a time t, $\sigma_{p1}{}^n$ is an elastic stress of the strand caused by the fatigue load, and $\sigma_{p2}{}^n$ is a plastic stress of the strand caused by a plastic deformation of the concrete in the compression zone.

12. The method for predicting the corrosion fatigue life of the prestressed concrete bridges according to claim 11, wherein the residual effective tension force at the time t is $T_{p_{m,p,t}} = E_p \varepsilon_p(1-p_{m,p,t})A_p \approx (1-p_{m,p,t}) \cdot T_0$, $E_p$ and $\varepsilon_p$ are an elastic modulus and a strain of an uncorroded strand, and $T_0$ is an initial tension force, respectively;

$$\rho_{m,t} = \frac{1.169 \times 10^{-5}}{L} \cdot R \int_0^t i_{ccor}(t)dt,$$

R is a corrosion variation coefficient for different types of steel bars in the structure, $i_{ccor}$ a corrosion current density, L is a corrosion length, and $A_p$ is an initial cross-section area of the strand.

13. The method for predicting the corrosion fatigue life of the prestressed concrete bridges according to claim 1, wherein in step 2), the stress of the strand under the combined action of the corrosion and the fatigue is $\sigma_{p,max}{}^n = \sigma_{p0}{}^n + \sigma_{p1}{}^n + \sigma_{p2}{}^n$, $\sigma_{p0}{}^n$ is a tensile stress of the strand caused by a residual effective tension force $T_{p_{m,p,t}}$ at a time t, $\sigma_{p1}{}^n$ is an elastic stress of the strand caused by the fatigue load, and $\sigma_{p2}{}^n$ is a plastic stress of the strand caused by a plastic deformation of the concrete in the compression zone.

14. The method for predicting the corrosion fatigue life of the prestressed concrete bridges according to claim 13, wherein the residual effective tension force at the time t is $T_{p_{m,p,t}} = E_p \sigma_p(1-p_{m,p,t})A_p \approx (1-p_{m,p,t}) \cdot T_0$, $E_p$ and $\sigma_p$ are an elastic modulus and a strain of an uncorroded strand, and $T_0$ is an initial tension force, respectively;

$$\rho_{m,t} = \frac{1.169 \times 10^{-5}}{L} \cdot R \int_0^t i_{ccor}(t)dt,$$

R is a corrosion variation coefficient for different types of steel bars in the structure, $i_{ccor}$ is a corrosion current density, L is a corrosion length, and $A_p$ is an initial cross-section area of the strand.

15. The method for predicting the corrosion fatigue life of the prestressed concrete bridges according to claim 13, wherein $\sigma_{p0}{}^n = T_{p_{m,p,t}}/A_{p,e}{}^n$; the residual cross-sectional area of the strand after n times of the fatigue is $$A_{p,e}^n = A_p - \sum_{k=1}^n \frac{1}{N_{k-1}}(A_p - A_{p,e}^{k-1}),$$

$N_{k-1}$ is a life value corresponding to the S-N curve of the strand under a stress amplitude after $(k-1)^{th}$ time of the fatigue load;

$$\sigma_{p1}^n = E_p \frac{\varepsilon_{ce}^n(h_p - x_n)}{x_n} \cdot k_t,$$

$k_t$, is a stress concentration coefficient caused by a pitting corrosion, $E_p$ is an elastic modulus of the uncorroded strand, $A_p$ is the initial cross-section area of the strand, $A_{p,e}^{k-1}$ is a remaining effective cross-section area of the strand after $(k-1)^{th}$ times of the fatigue load, $h_p$, is a distance from a center of the cross-section of the strand to the edge of the compression zone of the concrete, $\epsilon_{cp}^n$, is an irrecoverable plastic strain of the concrete at the edge of the compression zone after n times of the fatigue load;

$$\varepsilon_{cp}^n = \frac{f_c^0}{E_c^0} \left\{ \sum_{i=1}^n n_i [1g^{-1}(4.0935\alpha_{r,i} - 8.5576)] \right\}^{0.8382},$$

$f_c^0$ is an initial compressive strength of the concrete, $E_c^0$ is an initial elastic modulus of the concrete, $n_i$ is the number of the $i^{th}$ fatigue load, and $x_n$ is the height of the compression zone after n times of the fatigue load; and $\sigma_{p2}^n = E_p \cdot \epsilon_{pp}^n$, and $$\varepsilon_{sp}^n = \varepsilon_{cp}^n \cdot \frac{h_s - x_n}{x_n},$$

$\epsilon_{pp}^n$ is the plastic strain of the strand.

16. The method for predicting the corrosion fatigue life of the prestressed concrete bridges according to claim 13, wherein in step 2), the stress of the strand under the combined action of the corrosion and the fatigue is $\sigma_{p,max}^n = \sigma_{p0}^n + \sigma_{p1}^n + \sigma_{p2}^n$, $\sigma_{p0}^n$ is a tensile stress of the strand caused by a residual effective tension force $T_{P_{m,p,t}}$ at a time t, $\sigma_{p1}^n$ is an elastic stress of the strand caused by the fatigue load, and $\sigma_{p2}^n$ is a plastic stress of the strand caused by a plastic deformation of the concrete in the compression zone.

17. The method for predicting the corrosion fatigue life of the prestressed concrete bridges according to claim 16, wherein the residual effective tension force at the time t is $T_{P_{m,p,t}} = E_P \epsilon_P (1-p_{m,p,t}) A_P \approx (1-p_{m,p,t}) \cdot T_0$, $E_p$ and $\epsilon_p$ are an elastic modulus and a strain of an uncorroded strand, and $T_0$ is an initial tension force, respectively;

$$\rho_{m,t} = \frac{1.169 \times 10^{-5}}{L} \cdot R \int_0^t i_{ccor}(t) dt,$$

R is a corrosion variation coefficient for different types of steel bars in the structure, $i_{ccor}$ is a corrosion current density, L is a corrosion length, and $A_p$ is an initial cross-section area of the strand.

18. The method for predicting the corrosion fatigue life of the prestressed concrete bridges according to claim 1, wherein a total stress of the longitudinal tension bar is $\sigma_{s,max}^n = -\sigma_{s0}^n + \sigma_{s1}^n + \sigma_{s2}^n$, $\sigma_{s0}^n$ is 0, $$\sigma_{s1}^n = E_s \frac{\varepsilon_{ce}^n(h_s - x_n)}{x_n} \cdot k_i,$$

$\sigma_{s2}^n = E_s \cdot \epsilon_{sp}^n$, $\epsilon_{sp}^n$ is a plastic strain of the longitudinal tension bar, $$\varepsilon_{sp}^n = \varepsilon_{cp}^n \cdot \frac{h_s - x_n}{x_n},$$

$h_s$ is a distance from a center of a cross-section of the longitudinal tension bar to the edge of the compression zone of the concrete, $E_s$ is the elastic modulus of the longitudinal tension bar, $k_t$ is the stress concentration coefficient caused by the pitting corrosion, and $x_n$ is a height of the compression zone height after n times of the fatigue load.

19. The method for predicting the corrosion fatigue life of the prestressed concrete bridges according to claim 1, wherein a specific implementation process of step 4) comprises:
 a): under a typical fatigue load, when n=1, calculating the irrecoverable plastic strain $\epsilon_{cp}^n$, of the concrete, a total stress value $\sigma_{p,max}^n$ of the strand, and a total stress value $\sigma_{s,max}^n$ of the longitudinal tension bar, wherein n is the number of fatigue cycles;
 b): determining whether a beam encounters a fatigue failure according to the fatigue failure criteria for the component materials in the following formulas, wherein the failure criterion for the concrete in the compression zone is $\epsilon_{cp}^n \geq 0.4\epsilon_{c0}$, $\epsilon_{c0}$ is an ultimate compressive strain of the concrete under a static load; the failure criterion for the stand is $\sigma_{p,max}^n > f_u$, and $f_u$ is the ultimate tensile strength of a strand; and the failure criterion for the longitudinal tension bar is $\sigma_{s,max}^n \geq f_y$, and $f_y$ is the yield strength of the longitudinal tension bar; and
 c): if the beam does not fail, increasing n, and repeating steps a) and b) until a material fails, wherein the current fatigue cycles n is the fatigue life of the structure.

20. A system for predicting the corrosion fatigue life of prestressed concrete bridges comprising:
 a calculating unit configured to: calculate a continuously degenerating elastic strain $\epsilon_{ce}^n$ and irrecoverable plastic strain $\epsilon_{cp}^n$ at the edge of the concrete in the compression zone under a fatigue load and a degenerated elastic modulus of the concrete;
 a predicting unit configured to: predict a corrosion level of a strand to obtain a residual tension force of structure, and calculate continuously-increasing strand stress $\sigma_{p,max}^n$ and longitudinal tension bar stress $\sigma_{s,max}^n$ in a tensile region under a coupled action of corrosion and fatigue using the elastic strain $\epsilon_{ce}^n$ the irrecoverable plastic strain $\epsilon_{cp}^n$, and the degenerated elastic modulus of the concrete and using a cross-section loss of a corroded strand as a fatigue damage parameter; and
 an evaluating unit configured to: perform real time stress-strain calculation on the concrete, the longitudinal tension bar, and the strand in response to an increased number of fatigue load cycles, and determine a failure mode of the structure based on a stress-strain growth relationship model and the failure criteria of the concrete, a longitudinal tension bar, and a strand, to evaluate a fatigue life of the structure, where the evaluating unit specifically implements the following operations:
 a): under a typical fatigue load, when n=1, calculating the irrecoverable plastic strain $\epsilon_{cp}^n$ of the concrete, a total stress value $\sigma_{p,max}^n$ of the strand, and a total stress value $\sigma_{s,max}^n$ of the longitudinal tension bar, where n is the number of fatigue cycles;

b): determining whether a beam encounters a fatigue failure according to a fatigue failure criteria for the component materials in following formulas, where a failure criteria for the concrete in the compression zone is $\epsilon_{cp}^{n} \geq 0.4\epsilon_{c0}$, and $\epsilon_{c0}$ is an ultimate compressive strain of the concrete under the static load; a failure criteria for the stand is $\sigma_{p,max}^{n} > f_u$, and $f_u$ is an ultimate tensile strength of a strand; and a failure criteria for the longitudinal tension bar is $\sigma_{s,max}^{n} \geq f_y$, $f_y$ is a yield strength of the longitudinal tension bar; and c): if the beam does not fail, increasing n, and repeating steps a) and b) until a material fails, where the current fatigue cycles n is the fatigue life of the structure.

\* \* \* \* \*